UNITED STATES PATENT OFFICE.

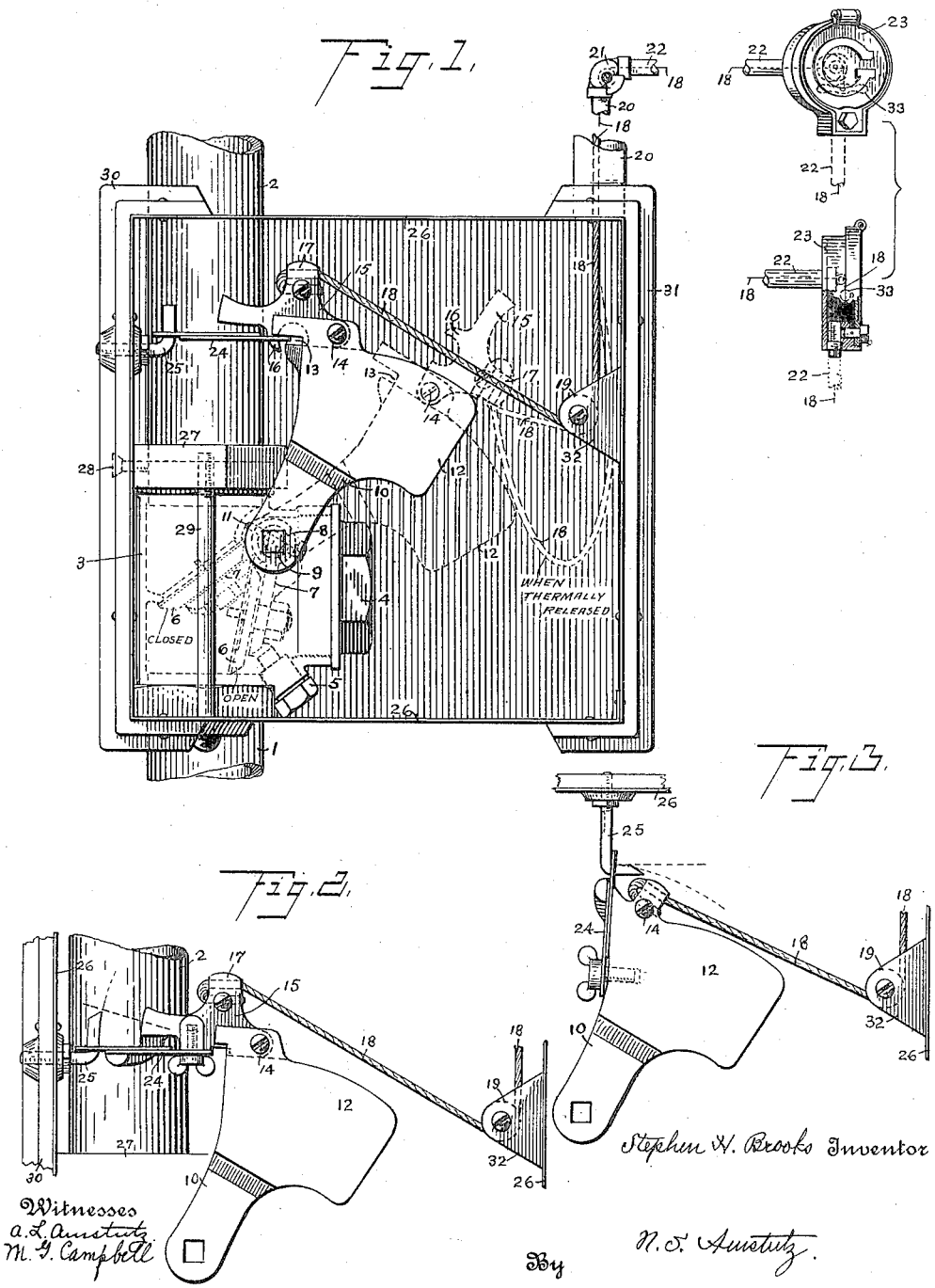

STEPHEN H. BROOKS, OF CLEVELAND, OHIO.

GAS-SHUT-OFF VALVE.

1,164,461.     Specification of Letters Patent.     Patented Dec. 14, 1915.

Application filed November 27, 1914. Serial No. 874,304.

*To all whom it may concern:*

Be it known that I, STEPHEN H. BROOKS, a citizen of the United States, residing at Cleveland, in the county of Cuyahoga and State of Ohio, have invented certain new and useful Improvements in Gas-Shut-Off Valves, of which the following is a specification.

My invention relates to improvements in shut-off valves and it appertains more especially to the features pointed out in the annexed claims.

The purpose of my invention is to provide a shut-off valve of the simplest construction, the fewest parts, one that will operate automatically through an abnormal rise of temperature, independently of any other closing provisions; that will be operable manually without reference to any automatic releasing mechanism; that will not introduce interferences between the several means for closing the valve.

With these and related ends in view I illustrate in the accompanying drawing such instances of adaptation as will disclose the broad features of the invention without limiting myself to the specific details shown.

Figure 1, is a side view of the assembled valve and casing in connection with a pull box through which the valve is to be operated manually to effect its closure. Fig. 2, shows an alternative means for connecting the detent to the stationary support. Fig. 3, instances a detentless valve.

Inventions of this type are as a rule exceedingly complex, costly to manufacture and uncertain in operation. It is well known that the fewer parts there are to a device the less chance there is for it to become disarranged, the more efficiently it will operate, and the longer it will remain in service without deterioration.

In the instance shown, I provide a main pipe of which end 1 is the inlet and end 2 is the outlet. Connecting these two ends is a suitable valve casing 3 having an inspecting opening closed by cap 4 and an ordinary drain outlet closed with plug 5. The valve 6 is of the usual swing type attached to arm 7 which in turn is fastened to the short stem 8. This stem projects from the valve casing 3 through a well known type of stuffing box to prevent leakage. The outer end of the stem may be squared at 9 to receive a similarly shaped opening of the lever 10 being held from displacement by a suitable pin 11 or suitable nut. The lever 10 has a weighted end 12 cast thereon. Substantially centrally above the stem 8 when the lever is in a raised position, a notch 13 is formed in the edge of 12, and somewhat to one side of this center a movable detent 15 is pivoted at 14. This detent has a hook end 16, a weighted projection and an up-standing ear 17 to which a cable 18 that passes over grooved roller 19 through conduit 20, roller elbow 21, conduit 22 to pull box 23 is attached. The parts described enable one to operate the valve 6 which is not spring actuated and is of itself not self closing. Independently of the manual operation detent 15 may be released from holding the weighted lever 10 in a raised position by the automatic severance of fusible link 24 thus placing valve 6 under the control of the weight 12.

In order that the valve can be automatically closed a fusible link 24 is interposed between the stationary support 25 and the depending hook 16. As shown in Fig. 1 the link projects into slot 13 so that as the detent 15 is raised the link will be "wiped" from off the hook 16. In Fig. 2 an alternative adaptation is shown in which the link 24 may be attached to detent 15 so as to move with it. A suitable stop is shown in Fig. 1 to limit the forward movement of the detent, and in order that the detent 15 will be properly supported and guided in its operation it is placed in a slot formed in arm 10. The bottom of this slot forms the limit stop referred to, acting in connection with a tangential bottom edge of the detent.

The valve casing 3 is positively held in the casing 26 by means of a suitable cleat 27 that engages the upper hexagon end of the valve casing. It is held by screw 28 from sidewise displacement and screw 29 coming up from the bottom from shifting vertically. Bracket 30 reinforces the valve side of the casing and bracket 31 reinforces the roller side of the casing. The roller support 32 is cast integrally with bracket 31 or it may be separately fastened if desired. The casing is provided with a suitable door secured by a padlock or otherwise and it may have perforations wherever thought desirable.

The attachment of the cable 18 to detent 15 and leading it to grooved roller 19, conduit 20 and roller-L 21 is such as to form an acute angle between cable 18 as it passes from detent 15 to roller 19 and its ascent into conduit 20. In this way the "slack" between detent 15 and roller 19 permits the lever 10 to drop independently of manual movement from the pull box when the fusible link 24 is fused. Without this angular relation of the cable weighted arm 10 might be prevented from dropping independently of the pull box.

The operation of the device is exceedingly simple. When the handle 33 in box 23 is pulled the detent 15 is raised disengaging the arm 10 from control of stationary support 25. The detent is swung around on pivot 14 until it is inverted when, should the valve stem 8 be "stuck", a continued pull of the handle will positively close the valve. Should the action be automatic the link 24 fuses releasing detent 15 and arm 10, which, if the valve is free, when the arm 10 reaches its extreme downward movement, will have closed the valve. As a precautionary measure the handle 33 would in the case of an emergency be first pulled so that the valve would be positively closed even though the thermal release might not by itself have succeeded in permitting its automatic closure.

From the adaptation shown it will be seen how extremely simple the mechanism is. The closure feature comprises only one or two parts extraneous of the valve; the automatic feature one or two parts extra; and the manual closure comprises but the cable, conduits, roller guides and pull box.

If desired the construction instanced may be still further simplified, as shown in Fig. 3, and the number of parts reduced by placing the support 25 about directly above the valve stem 8 with its hook projecting to the right instead of to the top, as shown, and fastening one end of link 24 to arm 10 by means of a screw or otherwise. In such an adaptation the pivoted detent 15 would be discarded and cable 18 secured to arm 10 by pin 14 in any suitable manner. The bosses above and below slot 13 would be omitted so as to make room for the link 24 which would stand up and down, the upper end hooked onto support 25. In order that when arm 10 is moved by cable 18 the link 24 may not lag behind a suitable projection from arm 10 may support the link on its rear side adjacent 25. The hook of support 25 may have its upper face beveled so as to facilitate the resetting of arm 10 and link 24, as when installing or testing, etc. As the hook will "give" somewhat, the combined effort of the weight 12 plus a pull on cable 18 will overcome the tangential projection and free the arm from the control of support 25. Weight 12 alone would not effect this release. Thus producing a gas shut-off without any movable detent whatever and the automatic member would be also movable with and supported by the valve closing arm 10 as shown in Fig. 3 without departing from the spirit of my invention.

What I claim is,

1. A main pipe valve, a one-piece weighted operating arm secured thereto, a pivoted detent supported thereon, a cable attached to the detent, suitable roller guides and conduits for said cable, a pull handle attached to the cable, a protective box for the same, a stationary support, a fusible member connecting the stationary support and the detent and adapted to automatically free the arm from the support whereby in addition the movement of the detent will also release the arm from the fusible member.

2. A cut-off valve comprising a suitable valve casing, a non-self closing valve, a stem therefor, an extraneous one-piece weighted lever attached to said stem, a detent pivoted thereon, a stationary support extraneous of the valve casing, a fusible member connecting the support and the detent, and a manually operated cable attached to said detent adapted to disengage the same from the control of the fusible member and subsequently positively close the valve.

3. A valve casing, a valve, means extraneous of the casing adapted to self close the valve, a pivoted detent carried thereby and movable thereon, a fusible support connected to the detent and adapted to hold the arm raised and the valve open, means adapted to manually actuate said detent and also move the valve into a positive closed position.

4. A suitable valve casing comprising a one-piece self closing member adapted to automatically close the valve, a releasable pivoted detent, means for manually operating the detent, means connected to the detent for independently and automatically releasing the same, said manual means adapted to move the self-closing member in case the valve has not been automatically closed.

5. A main pipe valve, means for automatically closing the valve, a detent pivoted on said means, a fusible member connected to the detent for holding the valve open, manual means coacting with said detent and closing arm to release said arm to permit the automatic closure of the valve, said manual means adapted also to positively close the valve.

6. A main valve, a one-piece weighted arm connected therewith tending when unrestrained to close the valve, a pivoted detent supported thereon, a support, a fusible member carried by said support and connected to said detent to restrain or automatically free the arm, a cable attached to the detent, and means for actuating the same at a distance therefrom whereby the detent may first be freed from the restraint of the fusible member and thereafter actuated until the valve has stopped flow therethrough.

In testimony whereof I affix my signature in presence of two witnesses.

STEPHEN H. BROOKS.

Witnesses:
HARRY B. ALLEN,
CHARLES STOKES.

Copies of this patent may be obtained for five cents each, by addressing the "Commissioner of Patents, Washington, D. C."